Sept. 28, 1965 V. D. ESTES 3,208,147
INCLINOMETER
Filed July 3, 1963
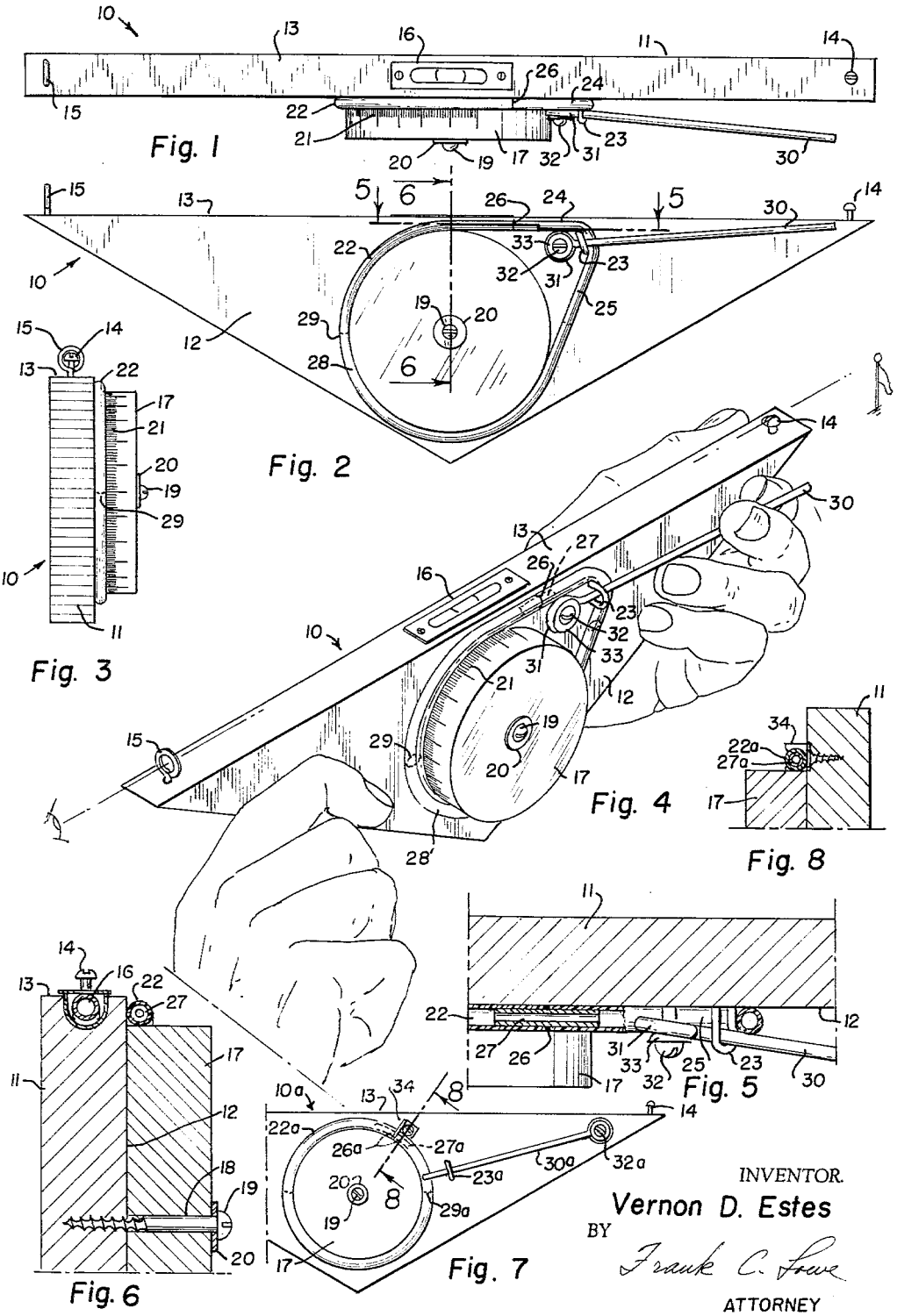
INVENTOR.
Vernon D. Estes
BY
Frank C. Lowe
ATTORNEY

United States Patent Office 3,208,147
Patented Sept. 28, 1965

3,208,147
INCLINOMETER
Vernon D. Estes, Penrose, Colo.
Filed July 3, 1963, Ser. No. 292,653
6 Claims. (Cl. 33—73)

This invention relates to instruments for measuring vertical angles commonly called inclinometers and more particularly to inclinometers which are ordinarily held by an individual while being used. As such, the invention will be hereinafter referred to as a hand inclinometer.

Various instruments which are adapted to measure vertical angles and angular elevations above the horizontal reference may be classified as inclinometers. Such instruments include high precision, rigidly-mounted transits and the like. They also include hand instruments that are simply held and sighted by an observer without any reliance upon a steady rest or the like, such as a sextant and a surveyor's hand level. The instruments of the hand type usually rely upon a level bubble to provide reference level and such instruments require the operator to ordinarily observe two or more indicators simultaneously. For example, when the observer is sighting the angular elevation of an object, he also observes a miniscus of a level bubble to keep his instrument in proper position or, as is the case with some sextants, he simultaneously sights a distant reference elevation such as the water level.

A fair degree of skill is required to become proficient in the use of such instruments simply because of the necessity of viewing and correlating two references simultaneously. Because of this, there has been a need and a demand for an instrument which is easier to use. For example, in amateur rocket flying contests, it becomes necessary to measure the elevations at which the model rockets will fly. The participants of such contests are seldom trained in the use of conventional inclinometers, yet they must measure, and measure quickly, vertical angles in order to ascertain the altitude to which the toy rockets fly.

The present invention was conceived and developed to meet the need of permitting a novice in surveying practices to measure vertical angles quickly and with a minimum of training. The invention comprises, in essence, an inclinometer having a simple set of sights, similar to ordinary gun sights, for observation of the elevation of an object combined with a simple arrangement of a transparent fluid line partially filled with fluid and a line lock which fixes the fluid level whenever an object is sighted. The instrument can then remain locked until a reading can be made.

It follows that another object of the invention is to provide a novel and improved construction of an inclinometer which is adapted to measure a vertical angle of a point above or below the horizontal and which is also adapted to easily and quickly measure a vertical angle between any two points without reference to the horizontal.

Another object of the invention is to provide a novel and improved inclinometer which is adapted to measure a vertical angle by simply sighting an object and without the need of obtaining readings or of adjusting scales or the position of the instrument simultaneously with the taking of the reading.

Another object of the invention is to provide a novel and improved inclinometer which is especially adapted for determining chaining corrections, slope stake setting operations and other survey work where an accuracy of about one-half degree is permissible.

Another object of the invention is to provide a novel and simplified construction of an inclinometer which is so easy to use that it may be used by a novice to measure vertical angles with an absolute minimum of instruction and practice.

Another object of the invention is to provide a novel and improved manual inclinometer which is a simple, low-cost, neat-appearing, rugged and durable unit.

With the foregoing and other objects in view, all of which more fully hereinafter appear, this invention comprises certain novel and improved constructions, combinations and arrangements of parts as hereinafter described, defined in the appended claims and illustrated in the accompanying drawing in which:

FIGURE 1 is a plan view of a preferred form of my inclinometer.

FIGURE 2 is a side elevational view of the unit shown at FIG. 1.

FIGURE 3 is an end elevational view of the unit as taken from the indicated arrow 3 at FIG. 2.

FIGURE 4 is an isometric view of the inclinometer, and, illustrating further in a diagrammatic manner, an observer's eye, his hands holding the instrument and an object which is being sighted, all to better show the manner in which the instrument is used.

FIGURE 5 is a fragmentary sectional detail as taken substantially from the indicated line 5—5 at FIG. 2, but on an enlarged scale.

FIGURE 6 is a fragmentary sectional detail as taken from the indicated line 6—6 at FIG. 2 but on an enlarged scale.

FIGURE 7 is a fragmentary side elevational view similar to portions of the showing at FIG. 2 but on a reduced scale and illustrating a modified embodiment of the invention.

FIGURE 8 is a fragmentary sectional view as taken from the indicated line 8—8 at FIG. 7.

Referring more particularly to the drawing, and to the construction illustrated at FIGS. 1 to 6, the improved inclinometer 10 is formed upon a body plate 11 which may be of any suitable material such as wood, and may be conveniently described as having an inverted triangular-shaped side 12 and a flat, extended sighting surface 13 along the top edge of the side. While this plate 11 is illustrated as being triangular, it is to be understood that other forms could also be used. While the sighting surface 13 along the top is straight and could be used for direct sighting, it is preferable that a front sight 14 and rear sight 15 are mounted thereon. Also, since this surface 13 will be horizontal when an instrument is aligned for horizontal zeroing-in, as hereafter explained, a conventional level bubble 16 may be embedded in this top surface to provide for a horizontal reading indication whenever the surface 13 is horizontal and the front and rear sights, 14 and 15, sight along a horizontal line.

A circular and disc-shaped protractor block 17 having an axially centered bearing socket 18 is mounted against a side of the body plate and held thereagainst with a snug frictional fit as by a wood screw 19 capped by a washer 20. This wood screw forms a shaft to lock the components in position but permit rotation of the protractor block. When the plate 11 is formed of a material other than wood, any other suitable shaft construction adapted to hold the protractor block 17 against the body plate 11 may be used.

This protractor block includes suitable markings 21 about its periphery indicating degrees. In most cases markings through a quadrant of 90 degrees will be adequate for measuring vertical angles. However, additional degree markings may extend from either side of the zero mark and even beyond the 90 degree mark if desired.

Readings of this instrument are obtained by a level bubble which moves around the protractor block. A suitable tube 22 of transparent, tough, pliable synthetic resin, such as the types commonly used as surgical tubes and the like, is formed as a closed loop, and is wrapped about the protractor block to lie snugly against the side of the body plate 11. The length of the tube 22 exceeds the circumference of the protractor block by an amount sufficient to permit one side of the tube to be pulled away from the circular protractor block 17 and to be placed about a U-shaped post 23 which upstands from the side face 12. When a wooden body plate 11 is used, this post may be a common U-shaped staple.

This post 23 is conveniently located at the forward side of the protractor block, at the side of the front sight 14, and a short distance below the top surface 13. So located, the tube 22 when placed about the post 23, forms a short upper tangential reach 24 from the protractor block 17 to the post 23 which is substantially parallel with the top surface 13 and a short lower tangential reach 25 from the protractor block 17 to the post which is at a steep angle approaching a right angle compared with the top surface 13. This tube is made continuous by abutting the ends 26 together over a short rigid holding tube 27, of glass or similar material, as clearly illustrated at FIG. 5.

Before connecting the ends of the tube together, it is partially filled with a fluid 28 such as kerosene or water or any light fluid having a moderately low viscosity. The amount of this fluid is preferably enough to fill the tube 22 about half way when it is wrapped about the protractor block 17 and fastened with the post 23 with the miniscus level 29 being at the approximate half-way position when the instrument is sighted horizontally. However, as will be hereinafter set forth, the filling of this tube need not be a precision operation and it is contemplated that even if a gradual loss of fluid from the tube were to occur, simple adjustments can be made to keep the instrument properly "zeroed-in." It is to be noted that where a synthetic resin is used for the tube 22, an intermolecular permeation of the fluid will occur through the wall of the tube and a very slow but definite loss of fluid in this manner will occur. However, replacement of fluid is a simple matter, for an end of the tube 22 may be removed from the glass connector 27, the tube partially refilled and the end replaced. As the instrument is rocked about its axis, as when being sighted to measure a vertical angle, the fluid 28 will freely flow from one position to another in the tube 22 to seek and maintain a level. However, it is apparent that if the pliable tube is pinched closed, preferably at a point above the fluid level, the fluid would then no longer flow but remain stationary regardless of further tilting or other handling of the instrument.

A lock rod 30 is provided at the side 12 of the body plate to effect this pinching and locking action. This rod 30 is formed with an eye 31 at one end thereof which is loosely connected to the side 12 by a screw 32 having a washer 33 thereon whose underface may be slightly dished to facilitate a rocking action of the eye 31 when it lies against the washer 33.

This rod 30 is preferably extended through the U-shaped post 23 to lie over the portion of the tube 22 wrapped about the post with the screw 32 being located adjacent to the protractor block 17 and with the outward end of the rod extending forwardly therefrom to a location near the forward point of the plate 11. The convenience of this location is illustrated at FIG. 4 which shows a one manner of holding the instrument while a sighting is being made. As in the illustration, an individual's left hand may grip the forward underside portion of the body plate 11 with his third finger being lifted to rest upon the forwardly extended end of the lock rod 30. It thus becomes a very simple matter to lock the fluid 28 in position within the tube by merely lowering the third finger and depressing the lock rod against the side of the body plate to the position indicated in broken lines at FIG. 5.

The operation and use of the instrument as described is exceedingly simple. The first step in using the instrument is to either zero the miniscus level 29 with the instrument being in a horizontal position or to zero it with respect to a base elevation by sighting it on the base elevation. When zeroing with the horizontal, an instrument may be held as illustrated at FIG. 4 and rocked back and forth until the bubble in the level 16 indicates the horizontal. Then, by depressing the lock rod 30, the miniscus is locked in place. Next, while holding the rod 30 depressed, the protractor block may be rotated until the zero indication of the markings 21 is at the miniscus level 29. The instrument is then ready for sighting angles above and below the horizontal. The operator simply visually aligns the front and rear sights to a selected object as in the manner of shooting a rifle and when properly sighted, he merely again depresses the lock rod 30. When the object is sighted, the fluid 28 in seeking its level will naturally be at the selected inclination. When the lock rod is depressed it will remain at this position. After sighting, and as long as the rod is depressed, the operator may then view the position of the miniscus on the protractor block and read the angle of inclination above or below the horizontal at his leisure.

When it is desired to measure a vertical angle without reference to the horizontal, the operator simply sights the object or line representing the base of the vertical angle, then depresses and holds the rod 30. Next, he sets the protractor block with the zero indication at the miniscus level. His next step is to then sight the higher object and when properly sighted again depress the lock rod 30 so that he may subsequently read the angular inclination. Vertical angles measured in this manner can be determined within a half degree when the operator exercises reasonable care and in most instances this precision of measurement is adequate.

The construction shown at FIGS. 7 and 8 illustrates a modified arrangement of the instrument where the tube 22a is adapted to fit around the protractor block with the ends 26a being locked in place as by a glass connector 27a at a convenient position where they will be normally above the miniscus level 29a in the tube and out of the way of the lock rod mechanism 30. The lock rod mechanism 30a is necessarily modified. In this alternate construction, the holding screw 32a is at the forward end of the block 11 and the lock rod 30a extends rearwardly therefrom with its end resting upon the tube 22a. A U-shaped post 23a, such as a staple, holds this rod in position as illustrated. By pressing the lock rod 30a, the tube 22a is locked and the angle indicated by the miniscus is determined as in the manner hereinbefore described. Likewise, the protractor block may be rotated with the tube remaining stationary. To prevent rotation of the tube when it is not being squeezed by the rod 30a, a pin-lock 34 may be inserted between the abutting ends 26a. This modified instrument operates substantially the same as hereinbefore described. A horizontal or a base setting is determined with the miniscus in a tube being locked in position. The protractor head is then rotated to place the zero reading at the miniscus. A subsequent elevation or reading is made and a lock rod 30a is depressed to again lock the miniscus within the tube. A direct reading of angular elevation is then possible.

Although I have now described my invention in considerable detail, it is obvious that others skilled in the art can devise and build alternate and equivalent constructions which are nevertheless within the spirit and scope of my invention. Hence, I desire that my protection be limited not as to the constructions illustrated and described but only by the proper scope of the appended claims.

I claim:
1. An inclinometer comprising:
 (a) a body means having a flat side portion and a sighting means and being adapted to be tilted and sighted on an object with the flat portion being held in a vertical plane and paralleling the line of sight,

(b) a shaft means outstanding from the side of the flat portion of the body, (c) a disk shaped protractor head rotatably mounted upon the shaft means with a frictional fit and having protractor markings at its peripheral face, (d) a closed transparent, flexible tube partially filled with fluid substantially embracing the protractor head with the markings of the protractor head being associatively correlated with the tube, whereby to visually correlate the fluid level in the tube with a protractor mark; and, (e) a lever carried upon the body member adjacent to the tube and being adapted to be depressed to close the tube with the body tilted at any selected position whereby to fix the position with the fluid being within the tube.

2. An inclinometer comprising:

(a) a body having a flat side portion and a sighting means and being adapted to be tilted and sighted on an object, with the flat portion being held in a vertical plane and paralleling the line of sight, (b) a shaft means outstanding from the side of the flat portion of the body, (c) a disc-shaped protractor head rotatably mounted upon the shaft means with a frictional fit and having protractor markings at its peripheral face, (d) a closed, transparent, flexible tube embracing a substantial portion of the protractor head, with the markings of the protractor head being associatively correlated with the tube, whereby to visually correlate the fluid level in the tube with a protractor mark, (e) a post outstanding from the body spaced outwardly from the protractor head and being adapted to hold a portion of the tube as a section spaced outwardly from the protractor head, and (f) a lever means carried upon the body adjacent to the post and being adapted to overlie the tube at the outwardly spaced portion and to be squeezed against the tube to close it when the body is tilted at a selected position, whereby to fix the position of fluid within the tube when the lever is closed.

3. The inclinometer defined in claim 2, wherein the tube is formed of a transparent synthetic resin material characterized by flexibility and toughness.

4. In the organization set forth in claim 3, wherein the post comprises a staple-like member having an eye portion therein, and the lever means comprises a rod loosely secured to the side of the body and extended through the eye portion of the post to lie upon the tube, and being thereby adapted to be depressed to squeeze the tube shut.

5. An inclinometer comprising:

(a) a body member having a sighting means and being adapted to be tilted and sighted on an object, (b) a shaft outstanding from a side of the body having its axis normal to the sight line through the sighting means and substantially horizontal when the body is held for sighting upon an object, (c) a circular disc rotatably mounted upon the shaft having protractor markings about its periphery, (d) a transparent tube partially filled with fluid embracing the disc, with the protractor markings of the disc being visually registered and correlated with the fluid level in the tube to visually register with adjacent protractor markings at any selected tilt of the body, (e) a tube closing means adapted to close the tube and prevent flow therethrough when the body is at any selected position, whereby to fix the position of the fluid, and (f) a stop means at the tube adapted to hold the tube in position whenever the protractor means is rotated, whereby to permit markings on the protractor to be shifted about the tube.

6. In the inclinometer defined in claim 5, wherein the tube is formed as a resilient plastic member having its ends interconnected to form a closed loop by a short tubular connector inserted into the tube ends, and the stop means comprises a pin-lock adapted to be inserted between the abutting ends thereof.

References Cited by the Examiner

UNITED STATES PATENTS

| 808,372 | 12/05 | Hunter et al. | 33—213 XR |
| 2,287,863 | 6/42 | Buckley | 33—213 |
| 2,308,206 | 1/43 | Poland | 33—73 |

FOREIGN PATENTS

| 354,998 | 8/05 | France. | |

ISAAC LISANN, *Primary Examiner.*